United States Patent [19]
Gritsenko et al.

[11] 3,864,487
[45] Feb. 4, 1975

[54] ANTIARHYTHMIC PHARMACEUTICAL PREPARATION CONTAINING ETHYL 10-(β-MORPHOLYLPROPIONYL) PHENTHIAZINE-2-CARBAMATE HYDROCHLORIDE

[76] Inventors: Anna Nikitichna Gritsenko, Volokolamskoe shosse, 80, kv. 28; Jury Ivanovich Vikhlyaev, Dorogomilovskaya ulitsa, 6/8, kv. 12; Semen Vladimirovich Zhuravlev, Minsskaya ploschad, 3/8, kv. 38; Natalya Veniaminovna Kaverina, Noropeshanaya ulitsa, 3, kv. 32; Zlata Petrovna Senova, Mytnaya ulitsa, 23, korpus 2, kv. 67; Olga Vasilievna Ulyanova, 2 ulitsa Oktyabrskogo polya, 21, kv. 46, all of Moscow, U.S.S.R.

[22] Filed: Aug. 16, 1971

[21] Appl. No.: 172,216

Related U.S. Application Data

[62] Division of Ser. No. 870,444, Oct. 10, 1969, Pat. No. 3,740,395.

[52] U.S. Cl. ............................................. 424/247
[51] Int. Cl. ........................................ A61b 27/00
[58] Field of Search .................................. 424/247

[56] References Cited
OTHER PUBLICATIONS
Clinical Report to Soviet Ministry of Health: "Practice of Clinical Application of Ethmozin for Treating Rhythm Disturbances in Cardiac Action," Zasalvskaja et al, (1960-1967).

Primary Examiner—Jerome D. Goldberg

[57] ABSTRACT

A method for preparing a novel composition of matter, ethyl 10-(β-morpholylpropionyl)-phenthiazine-2-carbamate hydrochloride, having the formula

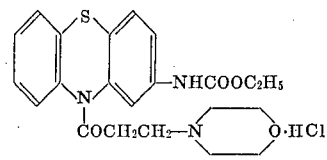

which comprises reacting ethyl phenthiazine-2-carbamate with β-chloropropionyl chloride in an inert organic solvent at the boiling point of the solvent used, condensing the resulting ethyl 10-(β-chloropropionyl)-phenthiazine-2-carbamate with morpholine in an inert organic solvent, treating the ethyl 10-(β-morpholylpropionyl)-phenthiazine-2-carbamate with hydrogen chloride, and separating the desired compound.

The novel compound, ethyl 10-(β-morpholylpropionyl)-phenthiazine-2-carbamate hydrochloride, is the active principle of an antiarhythmic pharmaceutical preparation.

5 Claims, No Drawings

ANTIARHYTHMIC PHARMACEUTICAL PREPARATION CONTAINING ETHYL 10-(β-MORPHOLYLPROPIONYL) PHENTHIAZINE-2-CARBAMATE HYDROCHLORIDE

This application is a division of application Ser. No. 870,444 filed Oct. 10, 1969 now U.S. Pat. No. 3,740,395.

This invention relates to a novel composition of matter, ethyl 10-(β-morpholylpropionyl)-phenthiazine-2-carbamate hydrochloride, and to the application of and a method for preparing the same.

This novel composition of matter is represented by the formula

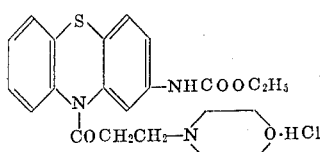

The compound of the invention is a yellowish powder which is soluble in water and alcohol; m.p. 188°–189°C (decomp.).

Ethyl 10-(β-morpholylpropionyl)-phenthiazine-2-carbamate hydrochloride is prepared, according to the invention, by reacting ethyl phenthiazine-2-carbamate and β-chloropropionyl chloride in an inert solvent, the process being conducted at the boiling point of the solvent used. The resulting ethyl 10-(β-chloropropionyl)-phenthiazine-2-carbamate is further reacted with morpholine in an inert organic solvent, followed by treating the ethyl 10-(β-morpholylpropionyl)-phenthiazine-2-carbamate with hydrogen chloride, and separating the desired compound.

It is preferable to use benzene or homologues thereof, or chloroform or dichloroethane as the organic solvent.

The present method for preparing ethyl 10-(β-morpholylpropionyl)-phenthiazine-2-carbamate hydrochloride is accomplished as follows.

Ethyl phenthiazine-2-carbamate is dissolved in an inert organic solvent, preferably in benzene or homologues thereof, chloroform, or dichloroethane, followed by adding to the solution β-chloropropionyl chloride, warming the reaction mixture to the boiling point of the solvent used and maintaining it at this temperature for a period of 3–6 hours.

The reaction mixture is clarified with activated carbon and cooled to room temperature, thereby causing ethyl 10-(β-chloropropionyl)-phenthiazine-2-carbamate to precipitate. The yield of this compound equals 65–70 percent of the theoretical amount; m.p. 169°–170°C.

The ethyl 10-(β-chloropropionyl)-phenthiazine-2-carbamate is dissolved in an organic solvent inert to the reactants, and morpholine is added to the solution.

To accelerate the process, the reaction mixture is heated to a temperature of 60°–120°C, followed by separating the morpholine hydrochloride formed, acidulating the solution with hydrochloric acid, clarifying the solution with activated carbon and making it alkaline to obtain the free base, viz., ethyl 10-(β-morpholylpropionyl)-phenthiazine-2-carbamate, which is extracted with an organic solvent and treated with hydrogen chloride gas. The resulting ethyl 10-(β-morpholylpropionyl)-phenthiazine-2-carbamate hydrochloride is obtained in a yield of 70–75 percent of the theoretical amount.

The process of preparing ethyl 10-(β-morpholylpropionyl)-phenthiazine-2-carbamate hydrochloride may be realized without separating the intermediate product, ethyl 10-(β-chloropropionyl)-phenthiazine-2-carbamate. In this instance, the reaction mixture after the first process stage is distilled to remove the organic solvent and excess β-chloropropionyl chloride, the residue is dissolved in an inert organic solvent, followed by adding thereto morpholine, and thereafter carrying out the process as described hereinabove.

The compound of the invention, ethyl 10-(β-morpholylpropionyl)-phenthiazine-2-carbamate hydrochloride has been found to possess physiological activity which warrants its application as the active principle of a pharmaceutical preparation. The pharmaceutical preparation, designated hereinafter as Ethmozin, is useful for treating arhythmia and contains ethyl 10-(β-morpholylpropionyl)-phenthiazine-2-carbamate hydrochloride as the active principle.

Ethmozin is noted for its pronounced antiarhythmic action and should, preferably, be used for treating arhythmic phenomena associated with disturbances of heart muscle conduction, e.g. diverse extrasystoles, paroxysmal tachycardia, and also paroxysms of auricular fibrillation.

Ethmozin is superior to the known antiarhythmic drugs, such as Quinidine and Novocainamide in that it exhibits a broader spectrum of therapeutic action and is devoid of toxic effects. Moreover, Quinidine and Novocainamide depress all heart functions, v.z. automatism, excitability, conduction, and contractability. Clinical experiments are indicative of the fact that Ethmozin, even when administered intravenously, depresses but little the heart muscle conduction and exerts no effect on heart contractability.

The pharmaceutical preparation, according to the invention, contains the active principle in combination with a filler, when used in tablets, or a diluent when intended for injections.

The effect of Ethmozin has been tested clinically on 298 patients suffering from various forms of cardiac rhythm disturbances of diverse ethiology. The rhythm disturbances manifested themselves, for the most part, in sinus tachycardia, various forms of extrasystole, paroxysmal tachycardia attacks, auricular fibrillation attacks, permanent fibrillar arhythmia, and also composite forms of arhythmia.

Clinical studies have shown Ethmozin to be particularly effective for treating such forms of cardiac rhythm disturbances as extrasystole, paroxysmal tachycardia and auricular fibrillation attacks caused by various diseases, e.g. atherosclerotic coronary cardiosclerosis, myocardial infarction, essential hypertension, thyrotoxicosis, and neurovegetative dystonia. The identified forms of arhythmia of rheumatic origin are somewhat less susceptible to treatment with Ethmozin.

Ethmozin is administered orally in the form of powder or 0.025 g tablets, or by intramuscular or intravenous injections in the form of solutions containing 2.5 wt. percent of the active principle.

For oral administration, the single dose equals 25mg. Initially the present drug is given by the mouth 3 times daily (single dose, a 25 mg tablet). If the patient shows good tolerance to the drug, as evidenced by the absence of dyspeptic phenomena, the daily dose is increased to 4–6 tablets. Where this increased dose gives no positive effect, and at the same time produces no untoward side effects, the daily dosage may be increased to 8–9 tablets (2 tablets 4 times daily). The average therapeutic dosage of Ethmozin equals 2–6 tablets daily. Where the administration of maximum doses results in relief, further treatment involves the administration of supporting doses (about two-thirds of the maximum dose). The course of treatment takes at least 7–15 days or, if necessary, as long as up to 4–6 weeks.

The overall dosage of Ethmozin required for the course of treatment is individual and depends upon the particular form of arhythmia.

For intramuscular injections, use is made of a 2.5 percent solution in ampoules, which is diluted, prior to injection, with a 0.25–0.5 percent solution of novocaine or with physiological solution.

The intravenous administration of Ethmozin is started with 2 ml of the 2.5 percent solution diluted to 10 ml with physiological solution or a 5 percent glucose solution.

The preparation is administered intramuscularly slowly for a period of 3–4 min. If the patient's tolerance is good, the single dose may be increased to 4 ml. Ethmozin dispensed in ampoules is also diluted with physiological solution or a 5 percent glucose solution to obtain a volume of 10 ml. Intravenous injection is introduced at a slow rate for a period of 4–5 minutes.

The doses of Ethmozin used and the methods of drug administration are selected depending upon the form of arhythmia being treated.

Patients' tolerance to Ethmozin is good.

Ethmozin causes but insignificant side effects, only slight pain in the epigastric area and dizziness being observed in selected cases. These side effects disappear on diminishing the dose of the drug and discontinuing the treatment.

Ethmozin is contraindicated when patients suffer from functional disturbances of parenchimatous organs or of heart muscle conduction, or have been previously treated with monoamino oxidase inhibitors. The administration of Ethmozin simultaneously with monoamino oxidase inhibitors is also contraindicated.

Ethmozin should be stored in a dry, dark and cool room together wtih Venena B.

For a better understanding of the method for preparing ethyl 10-($\beta$-morpholylpropionyl)-Phenthiazine-2-carbamate hydrochloride the following examples are presented by way of illustration.

EXAMPLE 1

To a solution of 10 g (0.035 mole) of ethyl phenthiazine-2-carbamate in 30 ml of anhydrous toluene is added dropwise 5.3 g (0.042 mole) of $\beta$-chloropropionyl chloride, and the mixture is refluxed at a temperature of 110°–120°C for a period of 4 hours, followed by clarifying the mixture with activated carbon and cooling it to room temperature.

A precipitate of ethyl 10-($\beta$-chloropropionyl)-phenthiazine-2-carbamate is removed by filtration. The yield is 10.2 g (77.5 percent of the theoretical amount); m.p. 169°–170°C.

Analysis: Found, percent: S, 8.49, 8.66; Cl, 9.45, 9.48.

Calcd. for $C_{18}H_{17}ClNO_3S$ : S, 8.51 ; Cl, 9.41.

10.2 g of the ester is dissolved in 50 ml of toluene, 4.72 g of morpholine is added thereto, and the mixture is refluxed at 110°–120°C for a period of 3 hours. A precipitate of morpholine hydrochloride is removed by filtration, and the filtrate is washed with water in order to remove excess morpholine, followed by acidulating with dilute hydrochloric acid to adjust the pH of the filtrate at 3. The acidic aqueous layer is separated, clarified by treatment with activated carbon and made alkaline until the pH equals 8–9. This procedure yields the free base of ethyl 10-($\beta$-morpholylpropionyl)-phenthiazine-2-carbamate : m.p. 156°–157°C.

Analysis: Found percent: S, 7.63, 7.68.

Calcd. for $C_{22}H_{25}N_3O_4S$: S, 7.50.

The free base thus obtained is extracted with toluene, the extract is dried over magnesium sulphate and to the anhydrous toluene solution is added an anhydrous ethereal solution of hydrogen chloride until the precipitation of the target compound is complete. This procedure yields 9.53g (76.2 percent of the theoretical amount) of ethyl 10-($\beta$-morpholylpropionyl)-phenthiazine-2-carbamate hydrochloride. After recrystallization from dichloroethane, the desired compound melts at 189°C (decomp.)

Analysis. Found : Cl, 7.65, 7.55; S, 6.85, 6.95.

Calcd. for $C_{22}H_{25}N_3O_4S$ HCl : Cl, 7.64; S, 6.91.

EXAMPLE 2

Ten grams of ethyl phenthiazine-2-carbamate is dissolved in 30 ml of dichloroethane, and to the solution is added dropwise 5.3g of $\beta$-chloropropionyl chloride, followed by refluxing the reaction mixture at 85°C for a period of 5 hours. The subsequent procedure is as disclosed in Example 1, except for the fact that use is made of dichloroethane as the solvent.

The desired compound is obtained in a yield of 9 g (72 percent of the theoretical amount).

EXAMPLE 3

To 10 g of ethyl phenthiazine-2-carbamate dissolved in 30 ml of chloroform is added dropwise 5.3 g of $\beta$-chloropropionyl chloride, and the reaction mixture is refluxed at a temperature of 65°C for a period of 5 hours. The subsequent procedure is as disclosed in Example 1, except for the fact that use is made of chloroform as the solvent.

The desired compound is obtained in a yield of 8.3 g (70 percent of the theoretical amount).

We claim:

1. An antiarhythmic pharmaceutical preparation comprising an antiarhythmically effective amount of ethyl 10-($\beta$-morpholylpropionyl)-phenthiazine-2-carbamate hydrochloride and a pharmaceutically acceptable carrier.

2. A pharmaceutical preparation according to claim 1 in the form of a tablet.

3. A pharmaceutical preparation according to claim 1 in the form of a solution.

4. A pharmaceutical preparation according to claim 2 wherein the tablet contains 25 mg of ethyl 10-($\beta$-morpholylpropionyl)-phenthiazine-2-carbamate hydrochloride.

5. A pharmaceutical preparation according to claim 3 wherein the solution contains 2.5 weight percent of ethyl 10-($\beta$-morpholylpropionyl)-phenthiazine-2-carbamate hydrochloride.

* * * * *

UNITED STATES PATENT AND TRADEMARK OFFICE

CERTIFICATE EXTENDING PATENT TERM
UNDER 35 U.S.C. 156

Patent No.    : 3,864,487

Dated         : February 4, 1975

Inventor(s)   : Gritsenko et al.

Patent Owner  : Anna Nikitichna Gritsenko et al.

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 U.S.C. 156 (b).

I have caused the seal of the Patent and Trademark Office to be affixed this 25th day of July, 1991.

Harry F. Manbeck, Jr.
Assistant Secretary and Commissioner of Patents and Trademarks